(12) United States Patent
Huang

(10) Patent No.: US 9,151,956 B2
(45) Date of Patent: Oct. 6, 2015

(54) LIGHT SOURCE SYSTEM FOR STEREOSCOPIC PROJECTION

(75) Inventor: Junejei Huang, Taoyuan-Hsien (TW)

(73) Assignee: DELTA ELECTRONICS, INC. (TW)

( * ) Notice: Subject to any disclaimer, the term of this patent is extended or adjusted under 35 U.S.C. 154(b) by 439 days.

(21) Appl. No.: 13/591,322

(22) Filed: Aug. 22, 2012

(65) Prior Publication Data

US 2013/0314670 A1 Nov. 28, 2013

(30) Foreign Application Priority Data

May 23, 2012 (TW) .............................. 101118265 A

(51) Int. Cl.
- *G03B 21/20* (2006.01)
- *G02B 27/22* (2006.01)
- *H04N 13/04* (2006.01)
- *H04N 13/00* (2006.01)

(52) U.S. Cl.
CPC .............. *G02B 27/22* (2013.01); *G03B 21/204* (2013.01); *G03B 21/2066* (2013.01); *G02B 27/2207* (2013.01); *G03B 21/208* (2013.01); *G03B 21/2033* (2013.01); *H04N 13/00* (2013.01); *H04N 13/04* (2013.01); *H04N 13/0422* (2013.01); *H04N 13/0431* (2013.01)

(58) Field of Classification Search
CPC ... H04N 13/00; H04N 13/04; H04N 13/0422; H04N 13/0431; G02B 27/22; G02B 27/2207; G03B 21/2066; G03B 21/208; G03B 21/2033; G03B 21/204
USPC ........ 353/7, 8; 348/51, 52, 53, 54, 55, 56, 57, 348/58, 59, 60
See application file for complete search history.

(56) References Cited

U.S. PATENT DOCUMENTS

| | | | |
|---|---|---|---|
| 6,334,685 | B1 | 1/2002 | Slobodin |
| 6,943,955 | B2 * | 9/2005 | Kaschke et al. .............. 359/630 |
| 7,862,182 | B2 * | 1/2011 | Thollot et al. .................. 353/84 |
| 8,201,945 | B2 * | 6/2012 | Ellinger et al. .................... 353/7 |
| 8,382,292 | B2 * | 2/2013 | Liu ................................. 353/85 |
| 8,746,888 | B2 * | 6/2014 | Silverstein ........................ 353/7 |

(Continued)

FOREIGN PATENT DOCUMENTS

| | | |
|---|---|---|
| CN | 101995760 A | 3/2011 |
| TW | I340290 | 4/2011 |

OTHER PUBLICATIONS

Chinese Office Action corresponding to Application No. 201210161577.1; Date of Mailing: Dec. 22, 2014, with English remarks.

*Primary Examiner* — Bao-Luan Le
(74) *Attorney, Agent, or Firm* — Cantor Colburn LLP

(57) ABSTRACT

A light source system for stereoscopic projection is disclosed, which includes: at least one light source set, two filters, a rotary wheel, a TIR prism, a multiband filter and at least one reflector. The at least one light source set and the two filters are disposed at a first side of the rotary wheel, while the TIR prism, the reflector and the multiband filter are disposed at a second side of the rotary wheel. With the above arrangements, the light source system could provide different lights of different wavebands to a light valve of a projector in different time sequences, and the projector could thus project a right-eye view angle image and a left-eye view angle image to viewers to form a stereoscopic image.

11 Claims, 14 Drawing Sheets

(56) References Cited

U.S. PATENT DOCUMENTS

| | | | |
|---|---|---|---|
| 2010/0123879 A1* | 5/2010 | Liu | 353/85 |
| 2010/0208342 A1* | 8/2010 | Olsen | 359/464 |
| 2010/0238416 A1* | 9/2010 | Kuwata et al. | 353/69 |
| 2011/0128503 A1* | 6/2011 | Sawai et al. | 353/8 |
| 2013/0083081 A1* | 4/2013 | Silverstein | 345/690 |
| 2013/0181973 A1* | 7/2013 | Silverstein | 345/419 |
| 2013/0182320 A1* | 7/2013 | Silverstein | 359/464 |
| 2013/0182322 A1* | 7/2013 | Silverstein | 359/464 |

* cited by examiner

LIGHT SOURCE SYSTEM FOR STEREOSCOPIC PROJECTION

CROSS-REFERENCES TO RELATED APPLICATIONS

This application claims priority to Taiwan Patent Application No. 101118265 filed on May 23, 2012, which is hereby incorporated herein by reference in its entirety.

BACKGROUND OF THE INVENTION

1. Field of the Invention

The present invention relates to a light source system, and more particularly, to a light source system for stereoscopic projection.

2. Descriptions of the Related Art

Because solid-state light sources have a long service life, a high efficiency and can be switched rapidly, they have gradually replaced conventional light sources and are widely used as light source systems of stereoscopic projection apparatuses.

Generally, a solid-state light source system used in a stereoscopic projection apparatus mostly adopts a blue laser light source in combination with two color wheels (rotary wheels) as a basic architecture. In detail, the blue laser light source is made up of two arrays of laser diodes with two different blue wavelengths. In different time sequences during the operation of the projection apparatus, the blue light of two different wavelengths is first converted into a red light or a green light by a first color wheel or just remains unchanged. Then, the red light, the green light or the blue light is converted into a left-eye view angle light or a right-eye view angle light by the other color wheel.

For the solid-state light source system with this architecture, the rotation of the first color wheel and the second color wheel must be synchronized precisely, so the solid-state light source system requires the use of a relatively complex control system. Furthermore, the two color wheels occupy a large space, which makes it difficult to miniaturize the solid-state light source system.

In view of this, it is important to provide a light source system that can improve at least one of the aforesaid shortcomings.

SUMMARY OF THE INVENTION

The primary objective of the present invention is to provide a light source system for stereoscopic projection, which can occupy a small space and avoid the problem of rotation synchronization of the color wheels.

To achieve the aforesaid objective, the present invention discloses a light source system for stereoscopic projection, which comprises the following: a first light source set, having a first solid-state light source for providing a first light of a first waveband and a second solid-state light source for providing a second light of a second waveband; two filters, being disposed in front of the first light source set, and matching the first waveband and the second waveband respectively; a rotary wheel, having a first side and second side opposite the first side, wherein the first light source set and the two filters are disposed at the first side; a total internal reflection (TIR) prism, being disposed at the second side of the rotary wheel, and having a first surface and a second surface that are connected to each other in a way so that the first surface faces the rotary wheel; a multiband filter, being disposed at the second side of the rotary wheel, and facing the second surface; and a first reflector that is disposed at the second side of the rotary wheel and faces the second surface, wherein the multiband filter is disposed between the first reflector and the second surface, with the first reflector oblique to the multiband filter.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the present invention will be explained with reference to embodiments thereof. The present invention relates to a light source system. It shall be appreciated that in the following embodiments and attached drawings, the description of these embodiments is only for the purpose of illustration rather than to limit the present invention. Meanwhile, in the following embodiments and the attached drawings, elements not directly related to the present invention are omitted from depiction; and the dimensional relationships among and the number of individual elements in the attached drawings are illustrated only for the ease of understanding but not to limit the actual scale, size and number.

Furthermore, the phrase "optically coupled" described hereinbelow generally refers to a propagation of lights between optical elements; that is, if two optical elements optically couple with each other, then it means that a light from one of the optical elements can propagate to the other of the optical elements.

Figure 1:
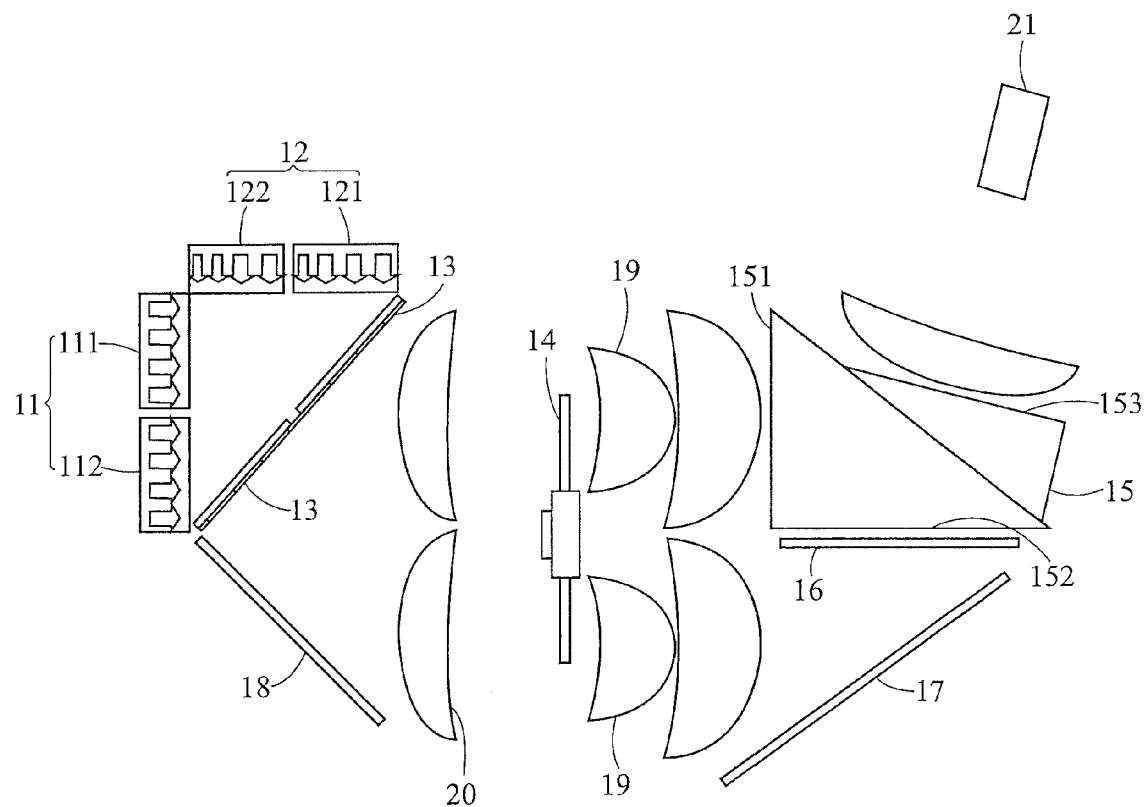
FIG. 1 is a schematic view illustrating the arrangement of the elements of the first preferred embodiment of a light source system for stereoscopic projection according to the present invention.
Figure 4A:
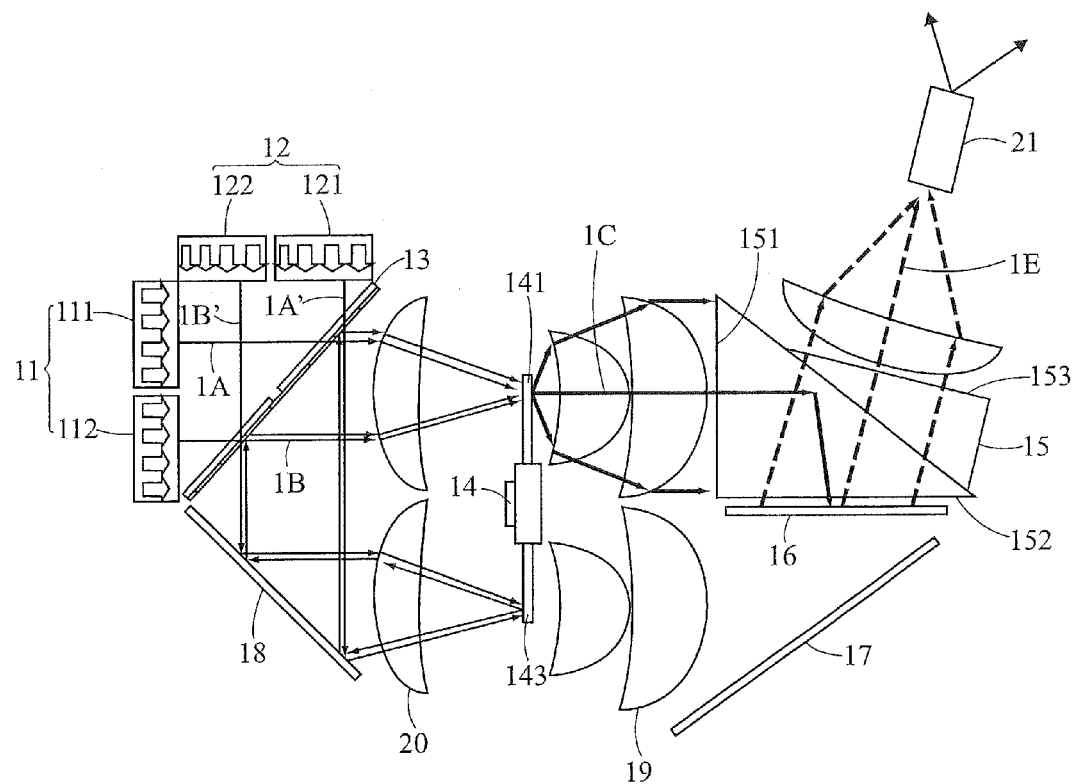
FIG. 4A is a schematic view illustrating the light path of the light source system for stereoscopic projection of FIG. 1 in the first time sequence.

FIG. 1 illustrates a schematic view of the arrangement of elements of the first preferred embodiment of a light source system for stereoscopic projection according to the present invention. FIG. 4A illustrates a schematic view of a light path of the light source system for stereoscopic projection of FIG. 1 in the first time sequence.

In the first embodiment, the light source system 1 for stereoscopic projection may comprise the following: a first light source set 11, a second light source set 12, two filters 13, a rotary wheel 14, a total internal reflection (TIR) prism 15, a multiband filter 16, a first reflector 17, a second reflector 18, two lens sets 19, two lenses 20 and a light homogenizing element 21.

Hereinbelow, the individual elements of the light source system 1 for stereoscopic projection will be first described in sequence, and then the method in which the light source system 1 for stereoscopic projection operates will be described.

The first light source set 11 has a first solid-state light source 111 for providing a first light 1A (as shown in FIG. 4A) of a first waveband (or wavelength) and a second solid-state light source 112 for providing a second light 1B (as shown in FIG. 4A) of a second waveband. The first solid-state light source 111 and the second solid-state light source 112 are disposed adjacent to each other so that the first solid-state light source 111 and the second solid-state light source 112 can have the same light exit direction (i.e., the first light 1A and the second light 1B can travel in parallel).

The second light source set 12 and the first light source set 11 form an included angle therebetween, which is preferably 90°. The second light source set 12 has a third solid-state light source 121 for providing another first light 1A' (as shown in FIG. 4A) of the first waveband and a fourth solid-state light source 122 for providing another second light 1B' (as shown in FIG. 4A) of the second waveband. The third solid-state light source 121 and the fourth solid-state light source 122 are also disposed adjacent to each other so that the third solid-state light source 121 and the fourth solid-state light source 122 can have the same light exit direction (i.e., the first light 1A' and the second light 1B' can travel in parallel).

Furthermore, because the angle is preferably 90°, the light exit directions of the first light 1A and the first light 1A' are perpendicular to each other and the light exit directions of the second light 1B and the second light 1B' are also perpendicular to each other.

In this embodiment, each of the first solid-state light source 111 to the fourth solid-state light source 122 is a laser solid-state light source and preferably a blue laser solid-state light source, so the first light 1A (1A') and the second light 1B (1B') are blue lights. The first waveband of the first light 1A (1A') and the second waveband of the second light 1B (1B') may be different from each other, but both are blue light wavebands. For example, the first waveband may be about 460 nanometers (nm), while the second waveband may be about 448 nm.

The two filters 13 are disposed in front of a light exit surface of the first light source set 11 and further disposed in front of a light exit surface of the second light source set 12 so that the two filters 13 are oblique to both the first light source set 11 and the second light source set 12. The two filters 13 optically couple with the first light source set 11 and the second light source set 12 so that the first light 1A (1A') and the second light 1B (1B') emitted by the first solid-state light source 111 to the fourth solid-state light source 122 can propagate to the two filters 13.

The two filters 13 may each be a transparent plate on which an optical coating is disposed to allow the light of a specific waveband to pass therethrough and to reflect the lights of other specific wavebands. In this embodiment, the two filters 13 match the first waveband and the second waveband respectively; for example, the upper filter 13 matches the first waveband and the lower filter 13 matches the second waveband. The filter 13 matching the first waveband allows only the first light 1A (1A') of the first waveband to pass therethrough but reflects lights of other wavebands (e.g., the second light 1B (1B')); and similarly, the filter 13 matching the second waveband allows only the second light 1B (1B') of the second waveband to pass therethrough but reflects lights of other wavebands (e.g., the first light 1A (1A')).

Figure 2:
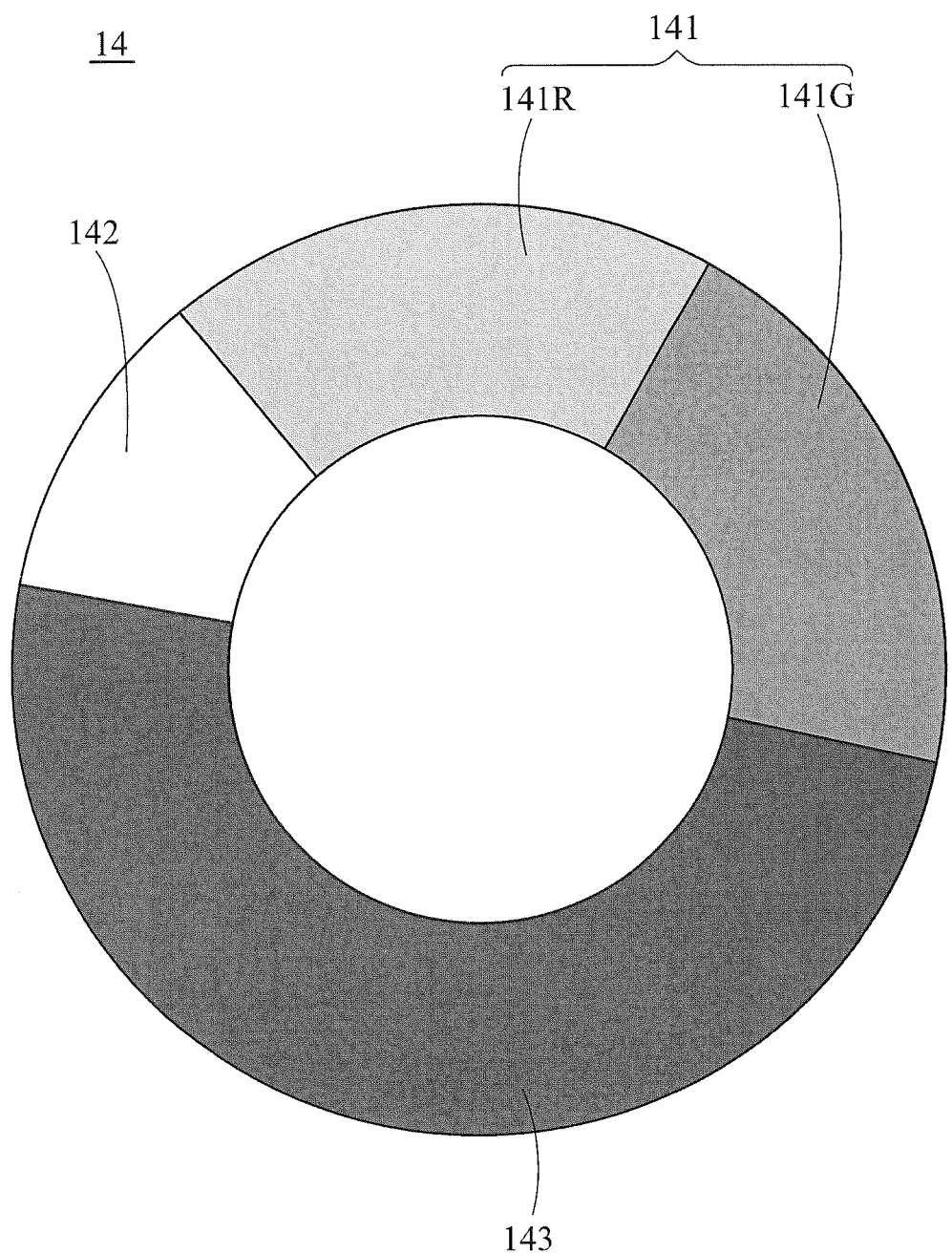
FIG. 2 is a front view of a rotary wheel of the light source system for a stereoscopic projection of FIG. 1.

With reference to both FIGS. 2 and 1, a front view of the rotary wheel of the light source system for stereoscopic projection of FIG. 1 is shown.

The rotary wheel 14 has a first side and a second side. The second side is opposite (i.e., or in reverse with) the first side, so when the first side is a front side, the second side is a back side. The first light source set 11, the second light source set 12 and the two filters 13 are all disposed at the first side of the rotary wheel 14.

The rotary wheel 14 has a first waveband converting region 141, a first transmission region 142 and a first reflecting region 143, and each of the first waveband converting region 141 and the first transmission region 142 is arranged symmetrically with a respective portion of the first reflecting region 143 with respect to a radial direction of the rotary wheel 14. That is, a region of the rotary wheel 14 that is offset by 180° from the first waveband converting region 141 is a portion of the first reflecting region 143, and a region of the rotary wheel 14 that is offset by 180° from the first transmission region 142 is the other portion of the first reflecting region 143.

The first waveband converting region 141 is adapted to (i.e. used to) convert the first light 1A (1A') or the second light 1B (1B') into a third light 1C (as shown in FIG. 4A) of a third waveband. The first transmission region 142 is adapted to allow the first light 1A (1A') and the second light 1B (1B') to pass therethrough directly without any waveband conversion on the first light 1A (1A') and the second light 1B (1B'). The first reflecting region 143 is adapted to reflect the first light 1A (1A') or the second light 1B (1B') so that the first light 1A (1A') or the second light 1B (1B') cannot pass through the rotary wheel 14. It is worth noting that the third light 1C can pass through the first reflecting region 143 directly without being reflected by the first reflecting region 143; that is, the first reflecting region 143 may be a filter.

In this embodiment, the first waveband converting region 141 is a transmissive waveband converting region. In detail, the first waveband converting region 141 has a transparent plate, a phosphor material disposed on the transparent plate, a third light reflective sheet disposed at the first side, and a first light reflective sheet and a second light reflective sheet disposed at the second side. The phosphor material is adapted to convert the first light 1A (1A') and the second light 1B (1B') into the third light 1C.

The third light 1C generated through conversion will travel in various directions. Specifically, a part of the third light 1C traveling towards the second side of the rotary wheel 14 will exit from the rotary wheel 14 from the second side directly; and the other part of the third light 1C traveling towards the first side of the rotary wheel 14 will impact the third light reflective sheet and then be reflected by the third light reflective sheet to travel towards the second side, and then exit from the rotary wheel 14 from the second side.

In other words, if the first light 1A (1A') or the second light 1B (1B') propagates from the first side of the rotary wheel 14 to the first waveband converting region 141, the first light 1A (1A') or the second light 1B (1B') can be converted into the third light 1C which then exits from the rotary wheel 14 from the second side.

In other embodiments, the first waveband converting region 141 may also be a reflective waveband converting region. In this case, the first waveband converting region 141 has a third light reflective sheet disposed at the first side and a phosphor material disposed on the third light reflective sheet. The phosphor material is adapted to convert the first light 1A (1A') and the second light 1B (1B') into the third light 1C. The third light 1C generated through conversion is reflected by the third light reflective sheet and then exits from the rotary wheel 14 from the first side. In other words, when the first light 1A (1A') or the second light 1B (1B') propagates from the first side of the rotary wheel 14 to the first waveband converting region 141, the first light 1A (1A') or the second light 1B (1B') can be converted into the third light 1C which then exits from the rotary wheel 14 from the first side.

In this embodiment, the first waveband converting region 141 further has a green waveband converting region 141G and a red waveband converting region 141R. The third light 1C generated by the green waveband converting region 141G through conversion is a green light, while the third light 1C generated by the red waveband converting region 141R through conversion is a red light. In other embodiments, the first waveband converting region 141 may further have a yellow waveband converting region, in which case the third light 1C may be a yellow light.

The TIR prism 15 is disposed at the second side of the rotary wheel 14, and may comprise two triangular prisms. Apart from having a first surface 151 and a second surface 152 which are connected to each other, the TIR prism 15 further has a light exit surface 153. The first surface 151 faces the rotary wheel 14 so that the third light 1C emitted from the rotary wheel 14 can propagate to the first surface 151.

Figure 3:
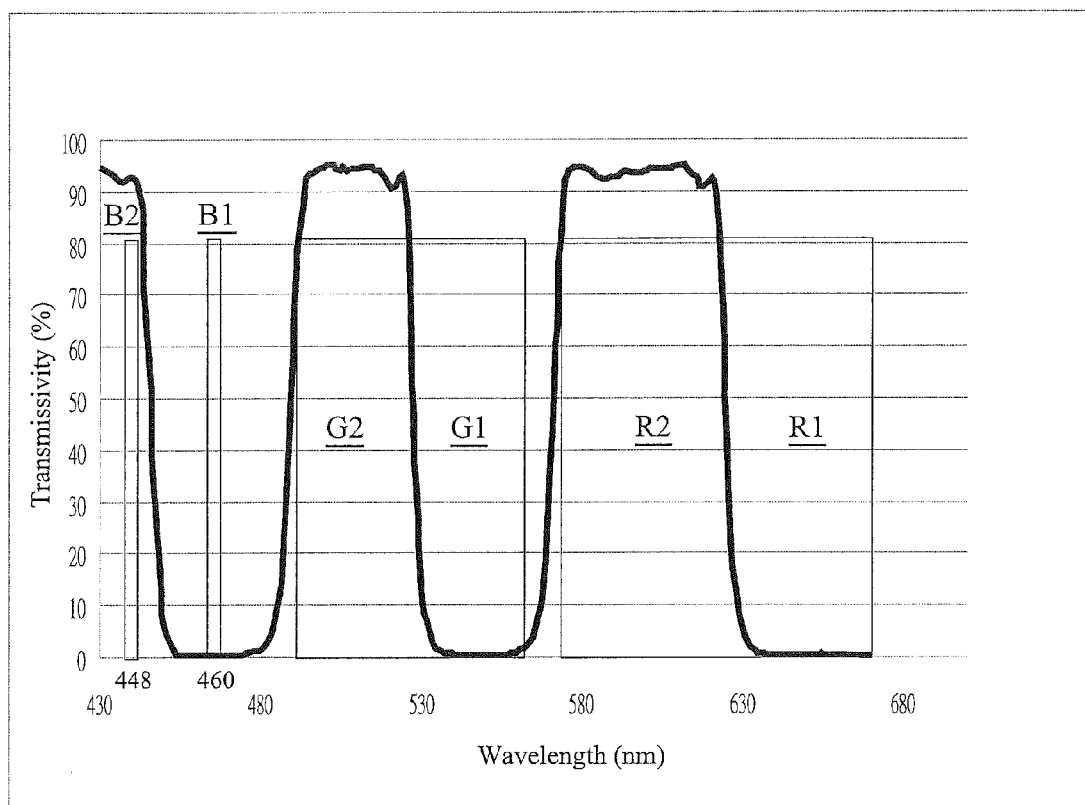
FIG. 3 is a schematic view illustrating the transmissivity versus wavebands of a multiband filter of the light source system for stereoscopic projection of FIG. 1.

With reference to both FIGS. 3 and 1, a schematic view illustrating the transmissivity versus wavebands of the multiband filter of the light source system for stereoscopic projection of FIG. 1 is shown.

The multiband filter 16 is also disposed at the second side of the rotary wheel 14, and faces the second surface 152 of the TIR prism 15. The multiband filter 16 may be a transparent plate on which a plurality of optical coatings are disposed to allow a fourth light 1D (as shown in FIG. 4C) of a fourth waveband (a waveband G2 or R2) included in the third light 1C to pass therethrough and reflect a fifth light 1E (as shown in FIG. 4A) of a fifth waveband (a waveband G1 or R1) included in the third light 1C. The multiband filter 16 can further allow the second light 1B (1B') to pass therethrough but reflect the first light 1A (1A').

Furthermore, the fourth waveband of the fourth light 1D and the fifth waveband of the fifth light 1E are contained in the third waveband of the third light 1C. In other words, if the third light 1C is a green light having a wide waveband, then the fourth light 1D and the fifth light 1E will each be a green light having a narrow waveband.

Accordingly, in this embodiment, the multiband filter 16 can allow the blue lights of a waveband B2 (the second waveband), the green lights of the waveband G2 (the fourth waveband) and the red lights of the waveband R2 (the fourth waveband) to pass therethrough, but reflect the blue lights of a waveband B1 (the first waveband), the green lights of the waveband G1 (the fifth waveband) and the red lights of the waveband R1 (the fifth waveband).

The first reflector 17 is disposed at the second side of the rotary wheel 14 and faces the second surface 152 of the TIR prism 15. Furthermore, the multiband filter 16 is disposed between the first reflector 17 and the second surface 152. The first reflector 17 is oblique to the multiband filter 16. The first reflector 17 can at least reflect the first light 1A (1A'), the second light 1B (1B') and the third light 1C.

The second reflector 18 is disposed at the first side of the rotary wheel 14. The second reflector 18 and the two filters 13 form another included angle therebetween, which is preferably 90°. In this embodiment, the second reflector 18 can at least reflect the first light 1A (1A') and the second light 1B (1B'); and in embodiments where the first waveband converting region 141 is a reflective waveband converting region, the second reflector 18 may further reflect the third light 1C.

The two lens sets 19 are disposed at the second side of the rotary wheel 14. One of the two lens sets 19 is disposed between the rotary wheel 14 and the first surface 151 of the TIR prism 15, and the other of the two lens sets 19 is disposed between the rotary wheel 14 and the first reflector 17. The third light 1C emitted from the rotary wheel 14 can be collimated by the lens sets 19, and then propagate to the TIR prism 15 or the first reflector 17.

The lenses 20 are disposed at the first side of the rotary wheel 14. One of the lenses 20 is disposed between the rotary wheel 14 and the two filters 13. The other lens 20 is disposed between the rotary wheel 14 and the second reflector 18. The lenses 20 can converge the first light 1A (1A') and the second light 1B (1B') onto the rotary wheel 14.

The light homogenizing element 21 is disposed in front of the light exit surface 153 of the TIR prism 15, and is optically coupled with the TIR prism 15 to receive a light from the TIR prism 15. The light homogenizing element 21 may be a lens array, a fly lens, an integration rod or a light tunnel, but is not limited thereto.

Thus, the individual elements of the light source system 1 for stereoscopic projection have been described above.

Next, the method in which light source system 1 for stereoscopic projection operates will be described. For ease of understanding and description, the operating process of the light source system 1 for stereoscopic projection is divided into a first time sequence, a second time sequence, a third time sequence and a fourth time sequence according to the rotation angles of the rotary wheel 14. This division of the operating process is only for the convenience of description but not for purpose of limitation. Furthermore, for convenience of understanding, the lights of different wavebands in FIG. 4A to FIG. 4D are depicted in different forms.

With reference to FIG. 4A, in the first time sequence, the first waveband converting region 141 of the rotary wheel 14 corresponds to (is optically coupled with) the two filters 13. The first reflecting region 143 corresponds to the second reflector 18. The first light 1A and the second light 1B emitted by the first light source set 11 pass through the two filters 13, and is then converged to the first waveband converting region 141.

The first light 1A' emitted by the second light source set 12 first passes through the filter 13 matching the first waveband (i.e., the upper filter 13) to reach the second reflector 18 where the first light 1A' is reflected by the second reflector 18 to the first reflecting region 143. Then, the first light 1A' is reflected by the first reflecting region 143 back to the second reflector 18. The first light 1A' is then reflected by the second reflector 18 to the filter 13 matching the second waveband (i.e., the lower filter 13), and then reflected by the filter 13 to be converged onto the first waveband converting region 141. Similarly, the second light 1B' emitted by the second light source set 12 is also converged onto the first waveband converting region 141 through the actions of the filter 13, the second reflector 18 and the first reflecting region 143.

As can be known from the above descriptions, both the first light 1A (1A') and the second light 1B (1B') emitted by the first light source set 11 and the second light source set 12 are converged onto the first waveband converting region 141.

After being converged onto the first waveband converting region 141, the first light 1A (1A') and the second light 1B (1B') are converted by the first waveband converting region 141 into the third light 1C of the third waveband. The third light 1C is a red light or a green light depending on whether the first light 1A (1A') and the second light 1B (1B') are converged onto the green waveband converting region 141G or the red waveband converting region 141R. Then, the third light 1C propagates into the TIR prism 15 at a relatively large incident angle, and is then reflected by the TIR prism 15 onto the multiband filter 16.

The fifth light 1E of the fifth waveband included in the third light 1C is reflected by the multiband filter 16 back into the TIR prism 15, and the lights (not shown, e.g., the fourth light) of other wavebands included in the third light 1C pass through the multiband filter 16. The fifth waveband is the waveband G1 or R1 shown in FIG. 3, so the fifth light 1E is still a green light or a red light.

The fifth light 1E propagates into the TIR prism 15 at a relatively small incident angle, so the fifth light 1E can directly pass through the TIR prism 15 into the light homogenizing element 21. After being homogenized by the light homogenizing element 21, the fifth light 1E enters into a light valve (e.g., a DMD, an LCD or an LCoS, not shown) of a projector. Finally, the fifth light 1E can be projected outwards by the projector as color components (i.e., a red component and a green component) of a first view angle image (e.g., a left-eye view angle image).

Figure 4B:
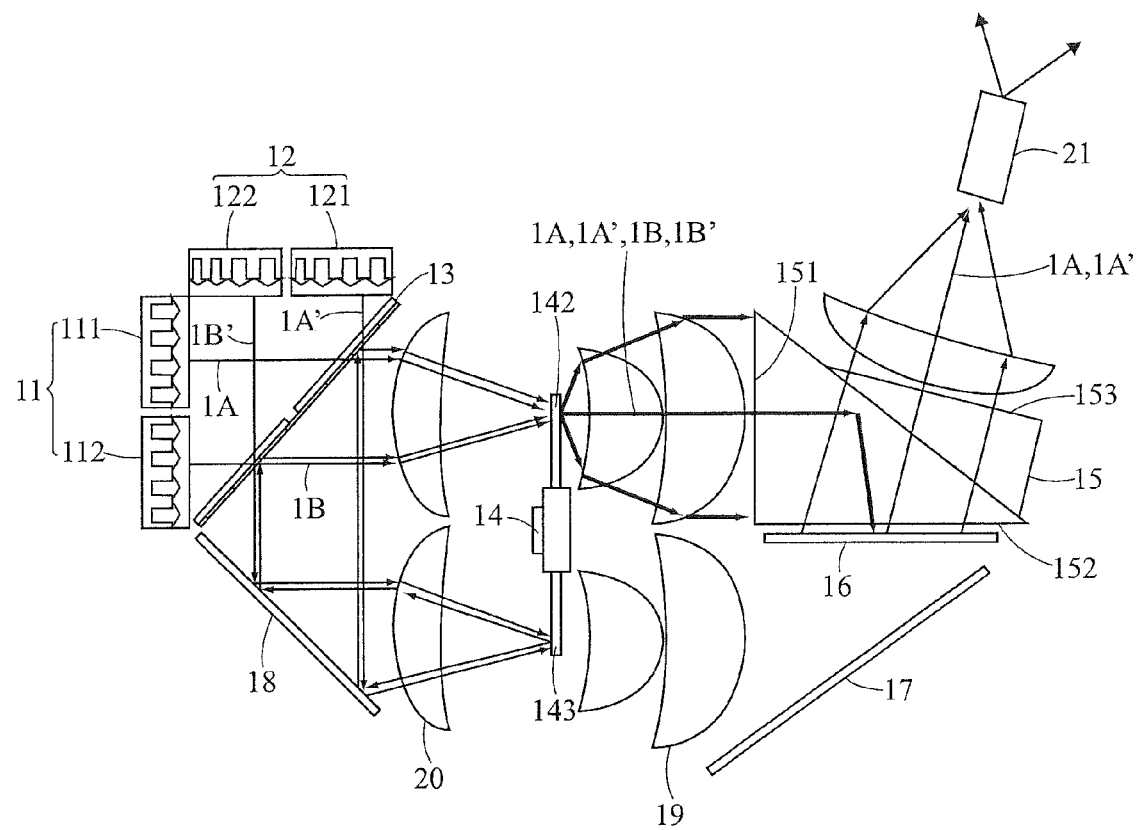
FIG. 4B is a schematic view illustrating the light path of the light source system for a stereoscopic projection of FIG. 1 in a second time sequence.
Figure 4C:
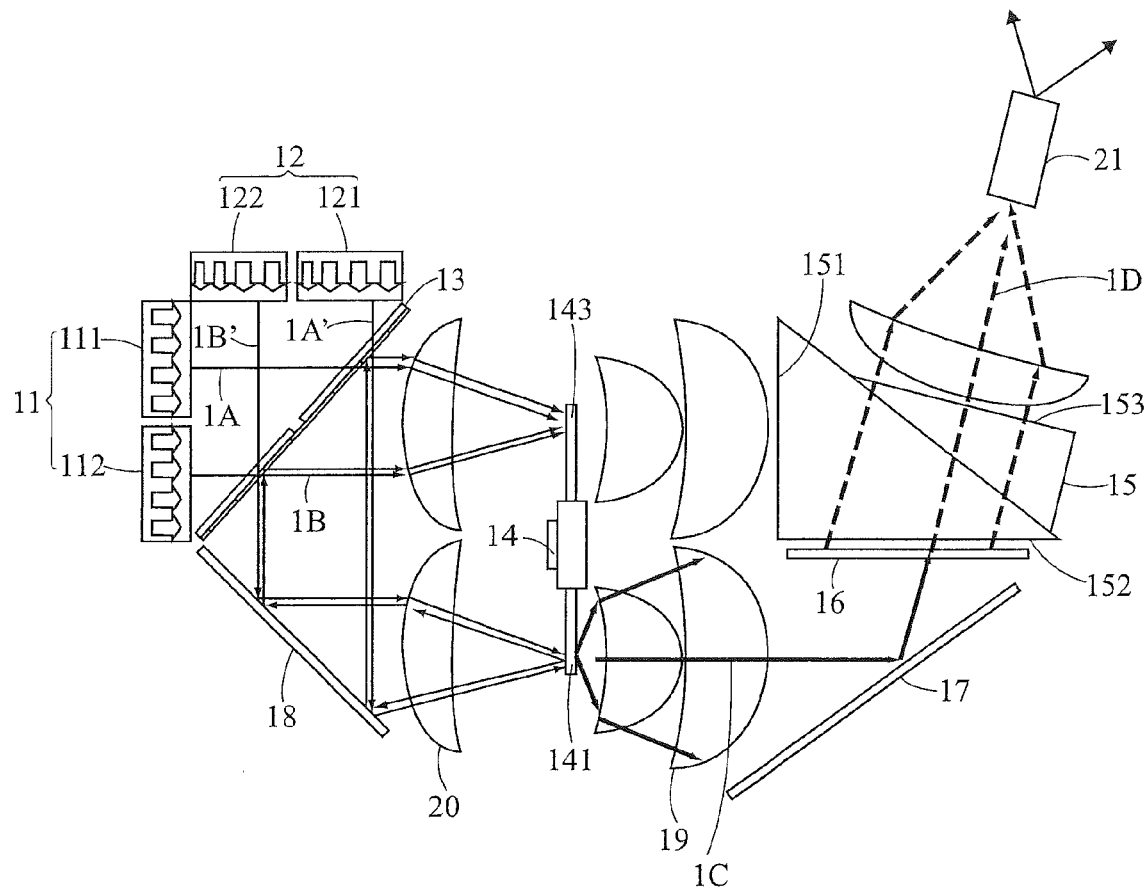
FIG. 4C is a schematic view illustrating the light path of the light source system for stereoscopic projection of FIG. 1 in a third time sequence.

FIG. 4B illustrates a schematic view of a light path of the light source system for stereoscopic projection of FIG. 1 in the second time sequence. In the second time sequence, the first transmission region 142 of the rotary wheel 14 corresponds to the two filters 13, and the first reflecting region 143 corresponds to the second reflector 18. The first light 1A and the second light 1B emitted by the first light source set 11 pass through the two filters 13, and are then converged onto the first transmission region 142. The first light 1A' and the second light 1B' emitted by the second light source set 12 are also converged onto the first transmission region 142 through the actions of the filters 13, the second reflector 18 and the first reflecting region 143.

After being converged onto the first transmission region 142, the first light 1A (1A') and the second light 1B (1B') directly pass through the first transmission region 142 into the TIR prism 15. Then, the first light 1A (1A') and the second light 1B (1B') are reflected by the TIR prism 15 to the multiband filter 16.

The first light 1A (1A') can be reflected by the multiband filter 16 back into the TIR prism 15, while the second light 1B (1B') passes through the multiband filter 16. The first light 1A (1A') that is reflected back into the TIR prism 15 can directly pass through the TIR prism 15 into the light homogenizing element 21. After being homogenized by the light homogenizing element 21, the first light 1A (1A') enters into the light valve of the projector. Finally, the first light 1A (1A') can be projected outwards by the projector as the other color component (i.e., a blue component) of the first view angle image (e.g., the left-eye view angle image).

As can be known from the above descriptions, after the first time sequence and the second time sequence, the light source system 1 for stereoscopic projection can at least output the lights of three wavebands (R1, G1, and B1) to the light valve of the projector so that the projector can project the complete first view angle image.

FIG. 4C illustrates a schematic view of a light path of the light source system for stereoscopic projection of FIG. 1 in the third time sequence. In the third time sequence, the first waveband converting region 141 of the rotary wheel 14 corresponds to the second reflector 18, while the first reflecting region 143 corresponds to the two filters 13.

The first light 1A' and the second light 1B' emitted by the second light source set 12 pass through the two filters 13, and are reflected by the second reflector 18 to be converged onto the first waveband converting region 141. The first light 1A and the second light 1B emitted by the first light source set 11 are also converged onto the first waveband converting region 141 through the actions of the filters 13, the second reflector 18 and the first reflecting region 143.

After converging onto the first waveband converting region 141, the first light 1A (1A') and the second light 1B (1B') are converted by the first waveband converting region 141 into the third light 1C of the third waveband. In this case, the third light 1C is a red light or a green light depending on whether the first light 1A (1A') and the second light 1B (1B') are converging onto the green waveband converting region 141G or the red waveband converting region 141R. Then, the third light 1C propagates into the first reflector 17, and is then reflected by the first reflector 17 to the multiband filter 16.

The multiband filter 16 allows the fourth light 1D of the fourth waveband included in the third light 1C to pass therethrough, but reflects the lights (not shown, e.g., the fifth light) of other wavebands included in the third light 1C. The fourth waveband is the waveband G2 or R2 shown in FIG. 3, so the fourth light 1D is still a green light or a red light.

The fourth light 1D propagates into the TIR prism 15 at a relatively small incident angle, and passes through the TIR prism 15 into the light homogenizing element 21. After being homogenized by the light homogenizing element 21, the fourth light 1D enters into the light valve of the projector. Finally, the fourth light 1D can be projected outwards by the projector as color components (i.e., a red component and a green component) of a second view angle image (e.g., a right-eye view angle image).

Figure 4D:
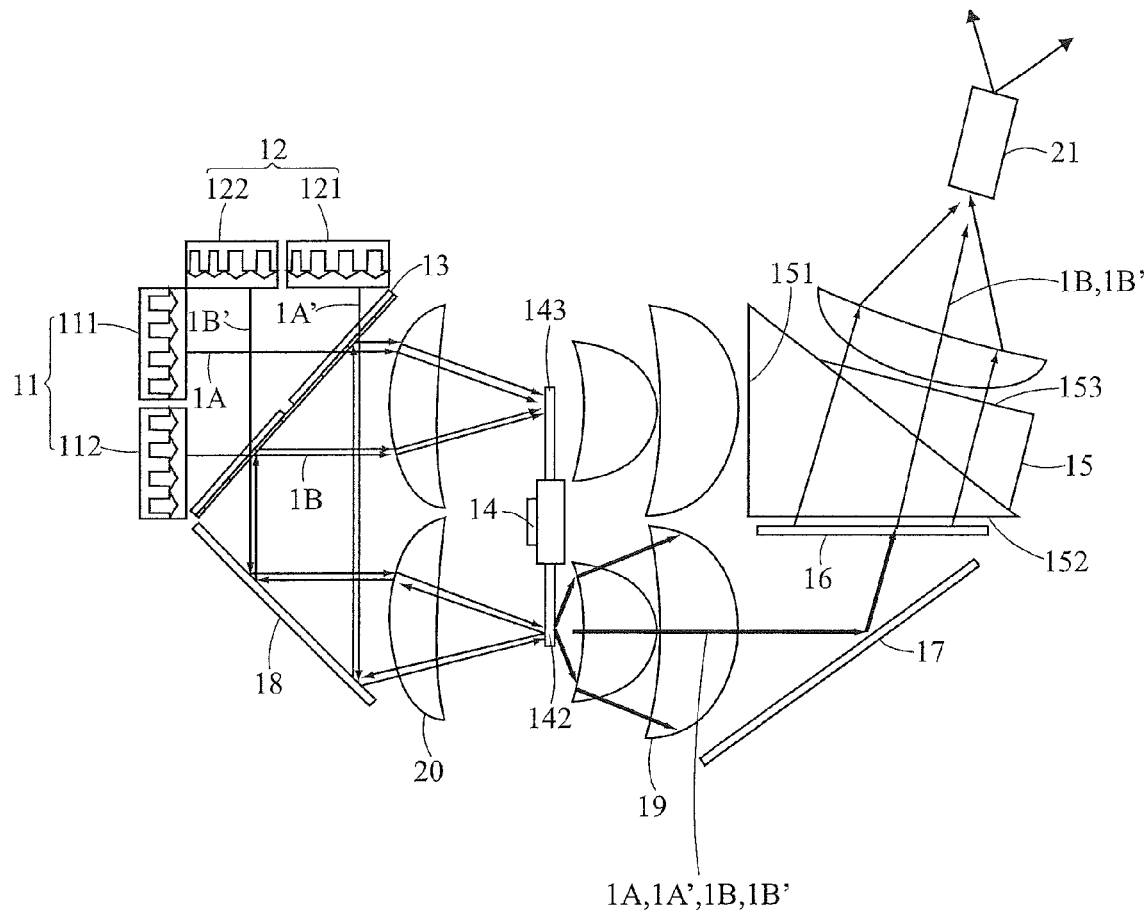
FIG. 4D is a schematic view illustrating the light path of the light source system for stereoscopic projection of FIG. 1 in a fourth time sequence.

FIG. 4D illustrates a schematic view of a light path of the light source system for stereoscopic projection of FIG. 1 in the fourth time sequence. In the fourth time sequence, the first transmission region 142 of the rotary wheel 14 corresponds to the second reflector 18. The first reflecting region 143 corresponds to the two filters 13. The first light 1A' and the second light 1B' emitted by the second light source set 12 pass through the two filters 13, and are reflected by the second reflector 18 to be converged onto the first transmission region 142. The first light 1A and the second light 1B emitted by the first light source set 11 are also converged onto the first transmission region 142 through the filters 13, the second reflector 18 and the first reflecting region 143.

After being converged onto the first transmission region 142, the first light 1A (1A') and the second light 1B (1B') directly pass through the first transmission region 142 to the first reflector 17. Then, the first light 1A (1A') and the second light 1B (1B') are reflected by the first reflector 17 to the multiband filter 16.

The multiband filter 16 can reflect the first light 1A (1A') to block the first light 1A (1A') from passing through the multiband filter 16. The second light 1B (1B') can pass through the multiband filter 16 into the TIR prism 15, and then pass through the TIR prism 15 into the light homogenizing element 21. After being homogenized by the light homogenizing element 21, the second light 1B (1B') enters into the light valve of the projector. Finally, the second light 1B (1B') can be projected outwards by the projector as the other color component (i.e., a blue component) of the second view angle image (e.g., the right-eye view angle image).

As can be known from the above descriptions, after the third time sequence and the fourth time sequence, the light source system 1 for stereoscopic projection can at least output the lights of another three wavebands (R2, G2, and B2) to the light valve of the projector so that the projector can project the complete second view angle image.

It shall be appreciated that in the first time sequence or the third time sequence, if the first waveband converting region 141 is a reflective waveband converting region, the third light 1C generated by the first waveband converting region 141 through conversion will be reflected by the first waveband converting region 141 to the two filters 13, then reflected by the two filters 13 to the second reflector 18, and further reflected by the second reflector 18 onto the first reflecting region 143. Then, the third light 1C can pass through the first reflecting region 143 to the TIR prism 15 or the first reflector 17.

Figure 5:
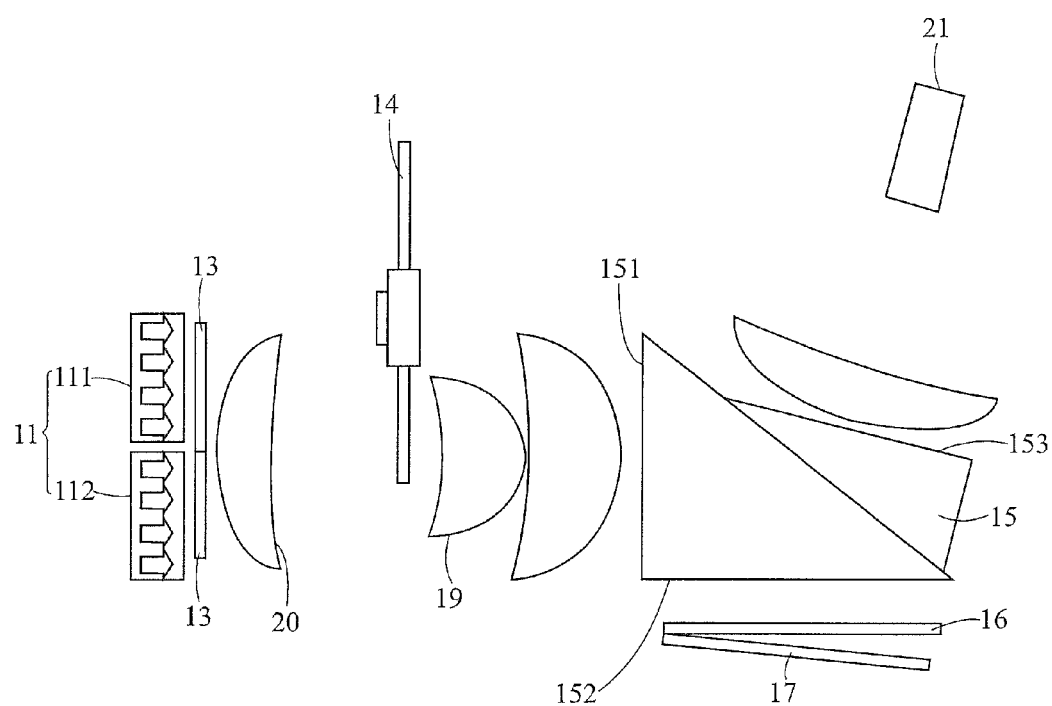
FIG. 5 is a schematic view illustrating the arrangement of the elements of the second preferred embodiment of the light source system for stereoscopic projection according to the present invention.
Figure 7A:
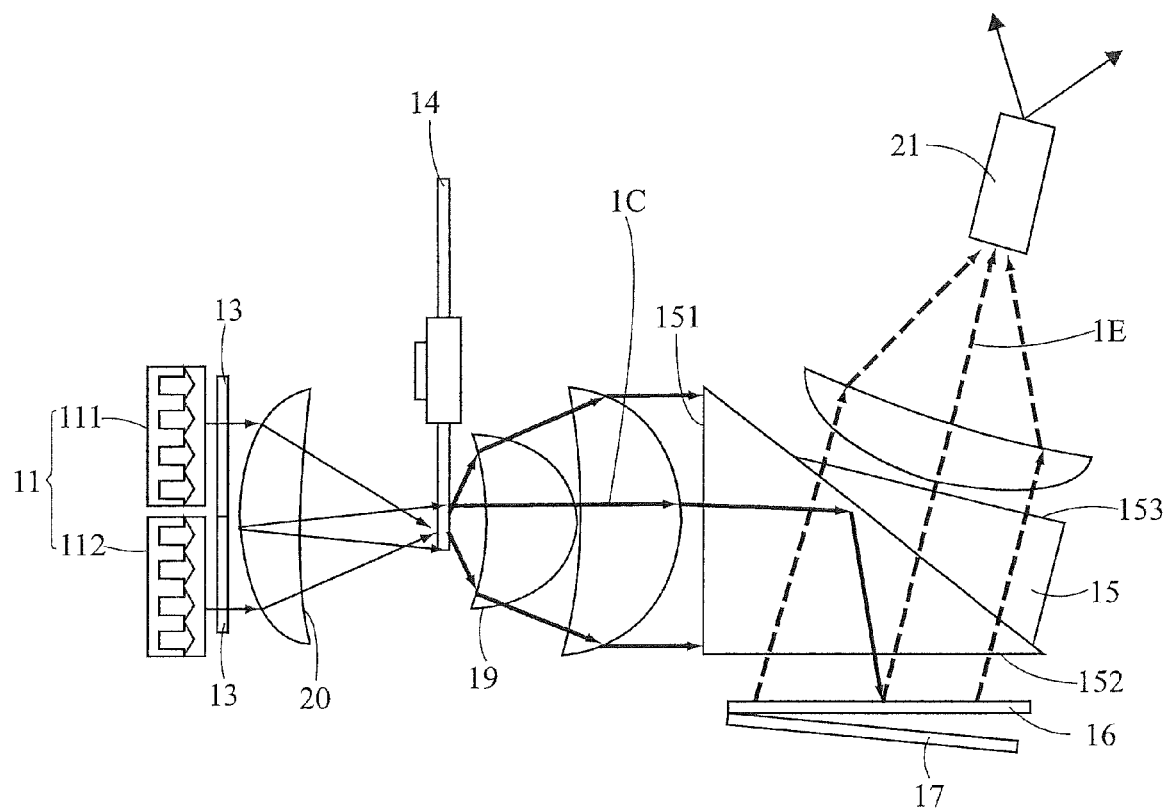
FIG. 7A is a schematic view illustrating a light path of the light source system for a stereoscopic projection of FIG. 5 in the first time sequence.

FIG. 5 illustrates a schematic view of the arrangement of elements of the second preferred embodiment of the light source system for stereoscopic projection according to the present invention. FIG. 7A illustrates a schematic view of a light path of the light source system for stereoscopic projection of FIG. 5 in the first time sequence.

In the second embodiment, the light source system 2 for stereoscopic projection may comprise the following: a first light source set 11, two filters 13, a rotary wheel 14, a TIR prism 15, a multiband filter 16, a first reflector 17, two lens sets 19, a lens 20 and a light homogenizing element 21.

The individual elements of the light source system 2 for stereoscopic projection are generally the same as those of the light source system 1 for stereoscopic projection except for the rotary wheel 14.

Figure 6:
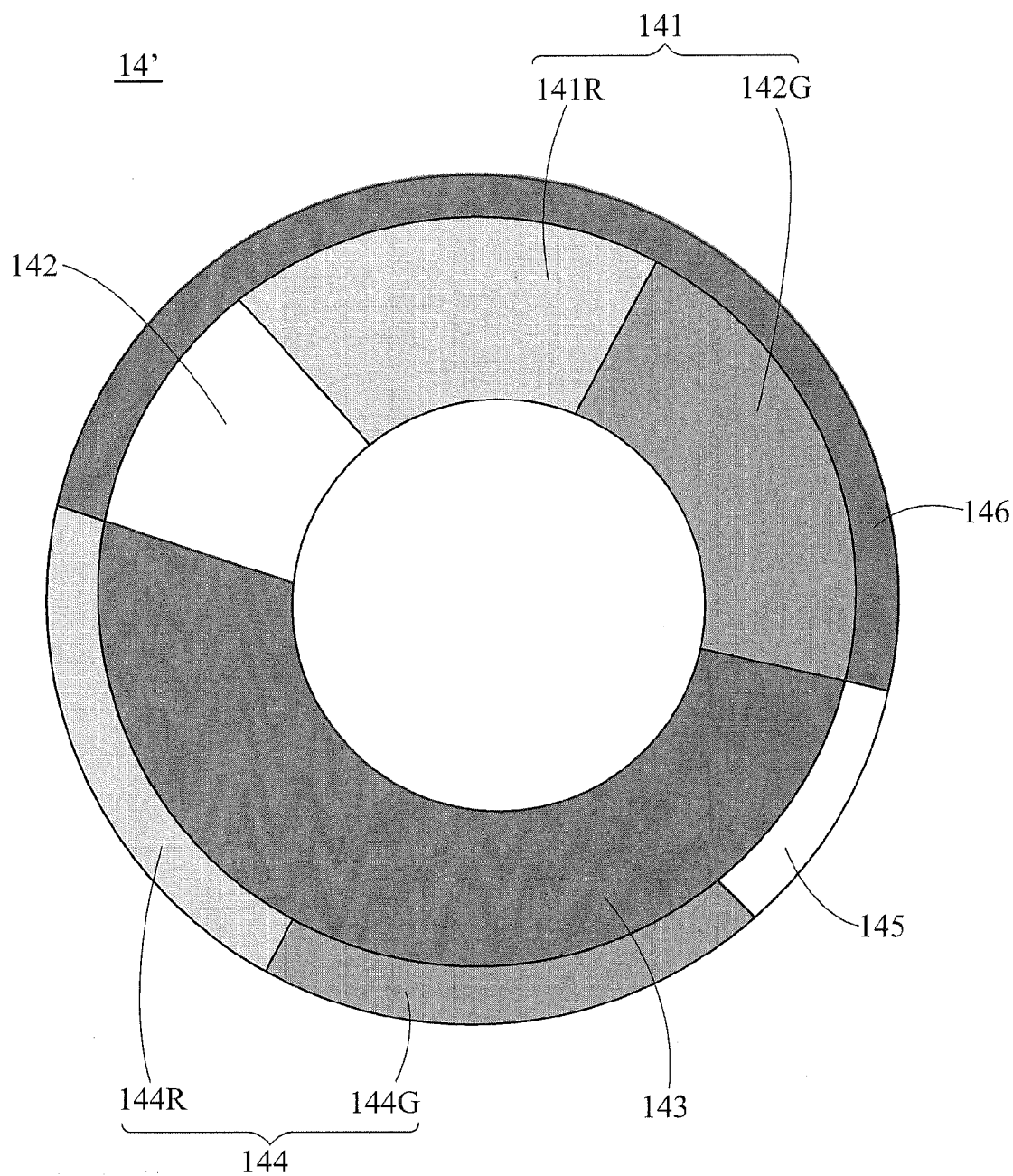
FIG. 6 is a front view of a rotary wheel of the light source system for a stereoscopic projection of FIG. 5.

With reference to FIG. 6, a front view of the rotary wheel of the light source system for stereoscopic projection of FIG. 5 is shown. In addition to the first waveband converting region 141, the first transmission region 142 and the first reflecting region 143, the rotary wheel 14 of the light source system 2 for stereoscopic projection further has a second waveband converting region 144, a second transmission region 145 and a second reflecting region 146.

Each of the second waveband converting region 144 and the second transmission region 145 is arranged symmetrically with a respective portion of the second reflecting region 146 with respect to the radial direction of the rotary wheel 14. Thus, a region of the rotary wheel 14 that is offset by 180° (i.e. 180 degrees) from the second waveband converting region 144 is a portion of the second reflecting region 146 and a region of the rotary wheel 14 that is offset by 180° from the second transmission region 145 is the other portion of the second reflecting region 146.

Furthermore, the second reflecting region 146 is further located outside the first waveband converting region 141 and the first transmission region 142, and the second waveband converting region 144 and the second transmission region 145 are both located outside the first reflecting region 143. In other words, the second waveband converting region 144, the second transmission region 145 and the second reflecting region 146 together enclose the first waveband converting region 141, the first transmission region 142 and the first reflecting region 143.

The second waveband converting region 144 is adapted to convert the first light 1A (1A') or the second light 1B (1B') into a third light 1C (as shown in FIG. 7A) of a third waveband. The second transmission region 145 is adapted to allow the first light 1A (1A') and the second light 1B (1B') to pass therethrough directly without any waveband conversion on the first light 1A (1A') and the second light 1B (1B'). The second reflecting region 146 is adapted to reflect the first light 1A (1A') or the second light 1B (1B') so that the first light 1A (1A') or the second light 1B (1B') cannot pass through the rotary wheel 14. It is worth noting that the third light 1C can pass through the second reflecting region 146 directly without being reflected by the second reflecting region 146; that is, the second reflecting region 146 may be a filter.

The second waveband converting region 144 may be a transmissive waveband converting region or a reflective waveband converting region. In this embodiment, the second waveband converting region 144 is a transmissive waveband converting region. Furthermore, in this embodiment, the second waveband converting region 144 has a green waveband converting region 144G and a red waveband converting region 144R; and in other embodiments, the second waveband converting region 144 may have a yellow waveband converting region.

Next, the method in which the light source system 2 for stereoscopic projection operates will be described. The operating process of the light source system 2 for stereoscopic projection may also be divided into a first time sequence to a fourth time sequence.

With reference to FIG. 7A, in the first time sequence, both the first waveband converting region 141 and the second reflecting region 146 of the rotary wheel 14 correspond to the two filters 13. The first light 1A and the second light 1B emitted by the first light source set 11 pass through the two filters 13, and are then converged onto the first waveband converting region 141 and/or the second reflecting region 146.

If a part of the first light 1A (1A') and the second light 1B (1B') is converged onto the second reflecting region 146, then such part of the first light 1A (1A') and the second light 1B (1B') will be reflected by the second reflecting region 146 to the two filters 13 and then be reflected by the two filters 13 onto the first waveband converting region 141. In other words, a part of the first light 1A (1A') and the second light 1B (1B') that is irradiated onto the second reflecting region 146 is finally also converged onto the first waveband converting region 141.

After being converged onto the first waveband converting region 141, the first light 1A (1A') and the second light 1B (1B') are converted by the first waveband converting region 141 into the third light 1C of the third waveband. The third light 1C is a red light or a green light depending on whether the first light 1A (1A') and the second light 1B (1B') are converged onto the green waveband converting region 141G or the red waveband converting region 141R. Next, the third light 1C propagates into the TIR prism 15 at a relatively large incident angle, and is then reflected by the TIR prism 15 onto the multiband filter 16.

The fifth light 1E of the fifth waveband included in the third light 1C is reflected by the multiband filter 16 back into the TIR prism 15, and the lights (not shown) of other wavebands included in the third light 1C pass through the multiband filter 16. The fifth waveband is the waveband G1 or R1 shown in FIG. 3, so the fifth light 1E is still a green light or a red light.

The fifth light 1E propagates into the TIR prism 15 at a relatively small incident angle, so the fifth light 1E can directly pass through the TIR prism 15 into the light homogenizing element 21. After being homogenized by the light homogenizing element 21, the fifth light 1E enters into the light valve of the projector. Finally, the fifth light 1E can be projected outwards by the projector as color components (i.e., a red component and a green component) of a first view angle image (e.g., a left-eye view angle image).

It shall be appreciated that the lights (not shown) of other wavebands included in the third light 1C passing through the multiband filter 16 propagate to the first reflector 17, and are then reflected by the first reflector 17 to pass through the TIR prism 15 along another light path without entering into the light homogenizing element 21.

Figure 7B:
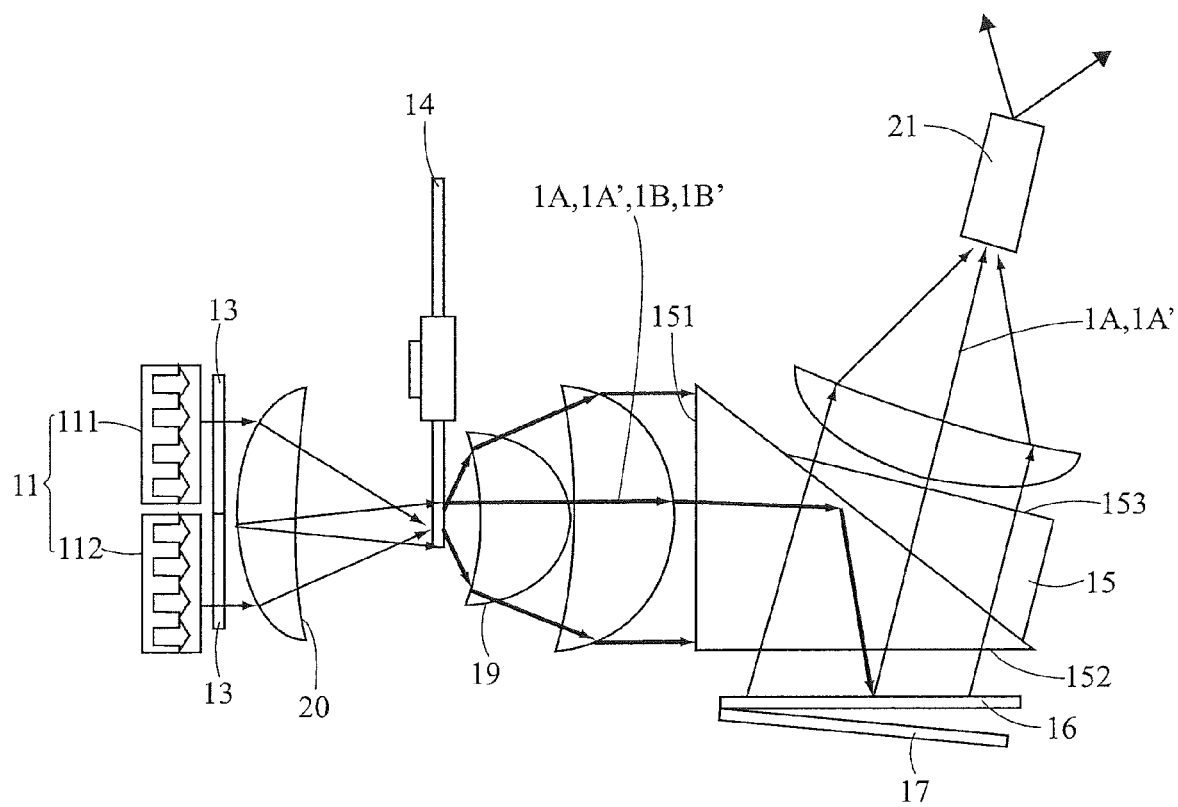
FIG. 7B is a schematic view illustrating a light path of the light source system for stereoscopic projection of FIG. 5 in the second time sequence.

FIG. 7B illustrate a schematic view of a light path of the light source system for stereoscopic projection of FIG. 5 in the second time sequence. In the second time sequence, both the first transmission region 142 and the second reflecting region 146 of the rotary wheel 14 correspond to the two filters 13. The first light 1A (1A') and the second light 1B (1B') emitted by the first light source set 11 pass through the two filters 13, and are then converged to the first transmission region 142 and/or the second reflecting region 146. A part of the first light 1A (1A') and the second light 1B (1B') that is converged onto the second reflecting region 146 is finally also converged onto the first transmission region 142.

After being converged onto the first transmission region 142, the first light 1A (1A') and the second light 1B (1B') directly pass through the first transmission region 142 into the TIR prism 15. Then, the first light 1A (1A') and the second light 1B (1B') are reflected by the TIR prism 15 to the multiband filter 16.

The first light 1A (1A') can be reflected by the multiband filter 16 back into the TIR prism 15, while the second light 1B (1B') passes through the multiband filter 16. The first light 1A (1A') that is reflected back into the TIR prism 15 can directly pass through the TIR prism 15 into the light homogenizing element 21. After being homogenized by the light homogenizing element 21, the first light 1A (1A') enters into the light valve of the projector. Finally, the first light 1A (1A') can be projected outwards by the projector as the other color component (i.e., a blue component) of the first view angle image (e.g., the left-eye view angle image). The second light 1B (1B') passing through the multiband filter 16 will not enter into the light homogenizing element 21.

As can be known from the above descriptions, after the first time sequence and the second time sequence, the light source system 2 for stereoscopic projection can also at least output the lights of three wavebands (R1, G1, and B1) to the light valve of the projector so that the projector can project the complete first view angle image.

Figure 7C:
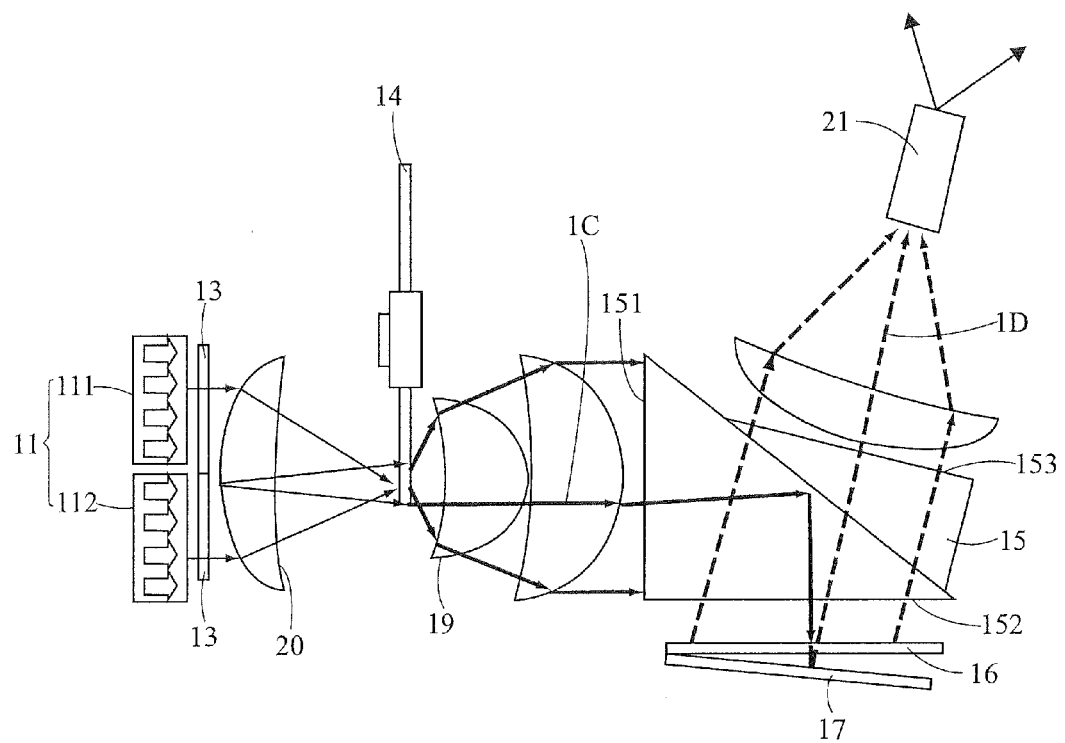
FIG. 7C is a schematic view illustrating a light path of the light source system for stereoscopic projection of FIG. 5 in the third time sequence.

FIG. 7C illustrates a schematic view of a light path of the light source system for stereoscopic projection of FIG. 5 in the third time sequence. In the third time sequence, both the second waveband converting region 144 and the first reflecting region 143 of the rotary wheel 14 correspond to the two filters 13. The first light 1A and the second light 1B emitted by the first light source set 11 are converged onto the second waveband converting region 144 and/or the first reflecting region 143. A part of the first light 1A (1A') and the second light 1B (1B') that is converged onto the first reflecting region 143 is finally also converged onto the second waveband converting region 144.

After being converged onto the second waveband converting region 144, the first light 1A (1A') and the second light 1B (1B') are converted by the second waveband converting region 144 into the third light 1C of the third waveband. In this case, the third light 1C is a red light or a green light depending on whether the first light 1A (1A') and the second light 1B (1B') are converged onto the green waveband converting region 144G or the red waveband converting region 144R. Then, the third light 1C propagates into the TIR prism 15 at a relatively large incident angle, and is then reflected by the TIR prism 15 to the multiband filter 16.

The multiband filter 16 allows the fourth light 1D of the fourth waveband included in the third light 1C to pass therethrough, but reflects the lights (not shown) of other wavebands included in the third light 1C. The fourth waveband is the waveband G2 or 122 shown in FIG. 3, so the fourth light 1D is still a green light or a red light.

The fourth light 1D passing through the multiband filter 16 propagates to the first reflector 17, and is reflected by the first reflector 17 to pass through the multiband filter 16 and the TIR prism 15 into the light homogenizing element 21. Then, the fourth light 1D enters into the light valve of the projector. Finally, the fourth light 1D can be projected outwards by the projector as color components (i.e., a red component and a green component) of a second view angle image (e.g., a right-eye view angle image).

It shall be appreciated that the lights (not shown) of other wavebands included in the third light 1C reflected by the multiband filter 16 will return to the TIR prism 15 at a relatively large incident angle, and thus, will be reflected by the TIR prism 15 without propagating into the light homogenizing element 21.

Figure 7D:
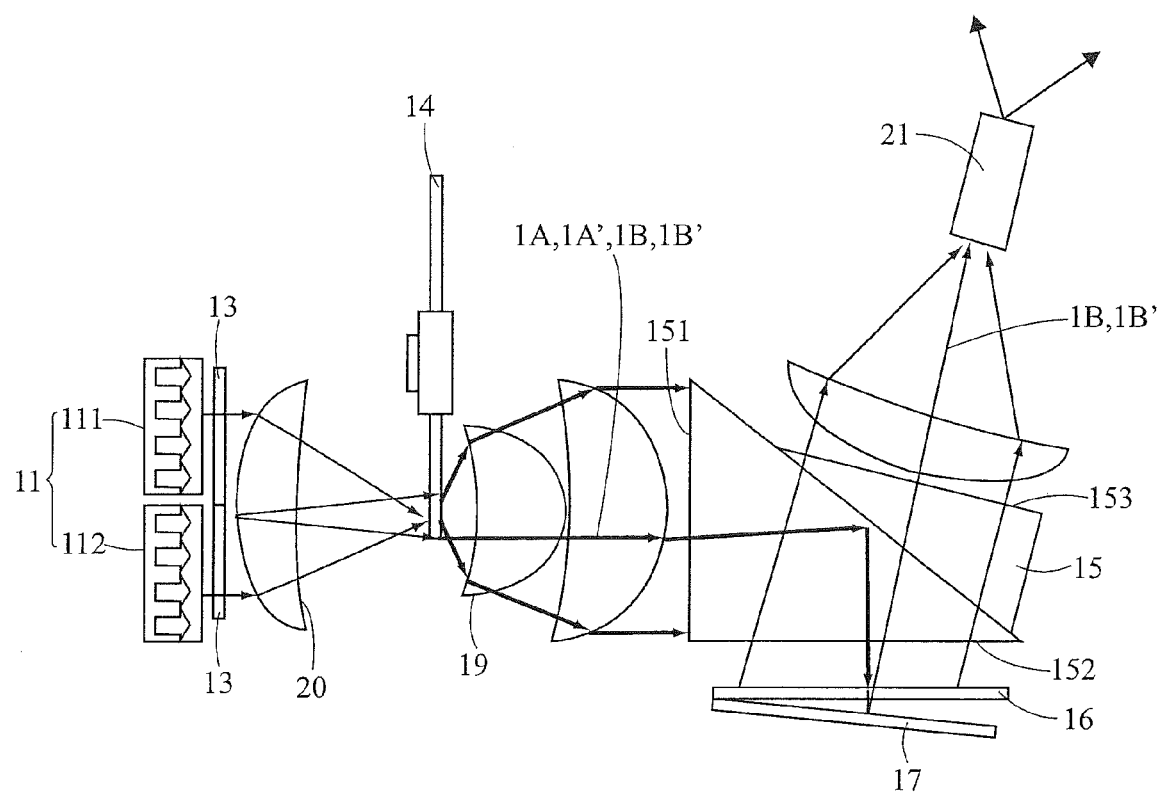
FIG. 7D is a schematic view illustrating a light path of the light source system for a stereoscopic projection of FIG. 5 in the fourth time sequence.

FIG. 7D illustrates the schematic view of a light path of the light source system for stereoscopic projection of FIG. 5 in the fourth time sequence. In the fourth time sequence, both the second transmission region 145 and the first reflecting region 143 of the rotary wheel 14 correspond to the two filters 13. The first light 1A (1A') and the second light 1B (1B') emitted by the first light source set 11 are converged onto the second transmission region 145 and/or the first reflecting region 143. A part of the first light 1A (1A') and the second light 1B (1B') that is converged onto the first reflecting region 143 is finally also converged onto the second transmission region 145.

After being converged onto the second transmission region 145, the first light 1A (1A') and the second light 1B (1B') directly pass through the second transmission region 145 into the TIR prism 15. Then, the first light 1A (1A') and the second light 1B (1B') are reflected by the TIR prism 15 to the multiband filter 16.

The multiband filter 16 can reflect the first light 1A (1A') to block the first light 1A (1A') from passing through the multiband filter 16. The second light 1B (1B') can pass through the multiband filter 16 to the first reflector 17. The second light 1B (1B') propagating to the first reflector 17 will be reflected by the first reflector 17 to pass through the multiband filter 16 and the TIR prism 15 into the light homogenizing element 21. Then, the second light 1B (1B') enters into the light valve of the projector. Finally, the second light 1B (1B') can be projected outwards by the projector as the other color component (i.e., a blue component) of the second view angle image (e.g., the right-eye view angle image).

The first light 1A (1A') reflected by the multiband filter 16 will return to the TIR prism 15 at a relatively large incident angle, and thus, will be reflected by the TIR prism 15 without propagating into the light homogenizing element 21.

As can be known from the above descriptions, after the third time sequence and the fourth time sequence, the light source system 2 for stereoscopic projection can also at least output the lights of another three wavebands (R2, G2, and B2) to the light valve of the projector so that the projector can project the complete second view angle image.

Figure 8:
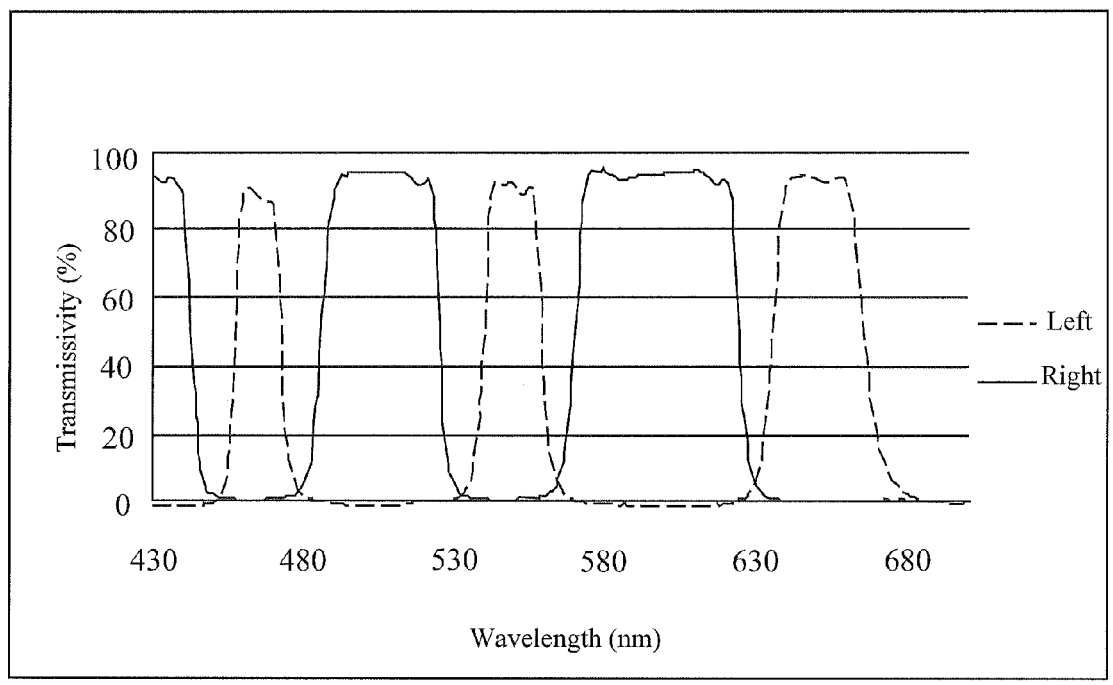
FIG. 8 is a schematic view illustrating the transmissivity versus wavebands of a pair of passive glasses used with the light source system for stereoscopic projection of FIG. 1 or FIG. 5.

When watching the first view angle image and the second view angle image that are alternately projected by the light source system 1 or 2 for stereoscopic projection, the user should wear a pair of passive glasses (e.g., a pair of passive glasses with characteristics shown in FIG. 8). The left lens of the passive glasses only allows the lights of the wavebands R1, G1 and B1 to pass therethrough, while the right lens of the passive glasses only allows the lights of the wavebands R2, G2 and B2 to pass therethrough. In this way, the user's left eye only accepts "the first view angle image formed by the lights of the wavebands R1, G1 and B1" and the user's right eye only accepts "the second view angle image formed by the lights of the wavebands R2, G2 and B2"; a stereoscopic image is then formed in the viewer's brain.

According to the above descriptions, by using solid-state light sources, a rotary wheel and a multiband filter, the light source system for stereoscopic projection of the present invention can output lights of different wavebands to a light valve of a projector in different time sequences so that the projector can project images of different view angles. Furthermore, because only one rotary wheel is used, the light source system for stereoscopic projection can avoid the problem of rotation synchronization of rotary wheels and, thus, can have a small volume.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light source system for stereoscopic projection, comprising:
    a first light source set, having a first solid-state light source for providing a first light of a first waveband and a second solid-state light source for providing a second light of a second waveband;
    two filters, being disposed in front of the first light source set, and matching the first waveband and the second waveband respectively;
    a rotary wheel, having a first side and a second side opposite the first side, wherein the first light source set and the two filters are disposed at the first side;
    a total internal reflection (TIR) prism, being disposed at the second side of the rotary wheel, and having a first surface and a second surface which are perpendicularly connected to each other, and further having a light exit surface which is oblique to the first and second surfaces, wherein the first surface faces the rotary wheel;
    a multiband filter, being disposed at the second side of the rotary wheel, and being adjacent to and directly facing the second surface; and
    a first reflector, being disposed at the second side of the rotary wheel and facing the second surface, wherein the multiband filter is disposed between the first reflector and the second surface, and the first reflector is oblique to and directly facing the multiband filter.

2. The light source system as claimed in claim 1, wherein the rotary wheel has a first waveband converting region, a first transmission region, a first reflecting region, a second waveband converting region, a second transmission region and a second reflecting region;
    each of the first waveband converting region and the first transmission region is arranged symmetrically with the first reflecting region, and each of the second waveband converting region and the second transmission region is arranged symmetrically with the second reflecting region;
    the second reflecting region is located outside the first waveband converting region and the first transmission region, and the second waveband converting region and the second transmission region are located outside the first reflecting region.

3. The light source system as claimed in claim 2, wherein each of the first and the second waveband converting regions is used to convert the first or the second light into a third light of a third waveband, each of the first and the second reflecting regions is used to reflect the first or the second light, and each of the first and the second transmission regions is used to allow the first or the second light to pass therethrough;
    the multiband filter is used to allow a fourth light of a fourth waveband included in the third light to pass therethrough and used to reflect a fifth light of a fifth waveband included in the third light, and the fourth waveband and the fifth waveband are contained in the third waveband.

4. The light source system as claimed in claim 1, further comprising a lens set which is disposed at the second side of the rotary wheel and between the rotary wheel and the first surface of the TIR prism.

5. The light source system as claimed in claim 1, further comprising a second light source set and a second reflector which are disposed at the first side of the rotary wheel, wherein the first light source set and the second light source set form an included angle therebetween, the two filters are further disposed in front of the second light source set, and the second reflector and the two filters form another included angle therebetween;
    the second light source set has a third solid-state light source for providing another first light of the first waveband and a fourth solid-state light source for providing another second light of the second waveband.

6. The light source system as claimed in claim 5, wherein the rotary wheel includes a first waveband converting region, a first transmission region and a first reflecting region, and each of the first waveband converting region and the first transmission region is arranged symmetrically with the first reflecting region.

7. The light source system as claimed in claim 6, wherein the first waveband converting region is used to convert the first or the second light into a third light of a third waveband, the first reflecting region is used to reflect the first or the second light, and the first transmission region is used to allow the first or the second light to pass therethrough;
    the multiband filter is used to allow a fourth light of a fourth waveband included in the third light to pass therethrough and used to reflect a fifth light of a fifth waveband included in the third light, and the fourth waveband and the fifth waveband are contained in the third waveband.

8. The light source system as claimed in claim 5, further comprising two lens sets which are disposed at the second side of the rotary wheel, wherein one of the two lens sets is disposed between the rotary wheel and the first surface of the TIR prism, and the other of the two lens sets is disposed between the rotary wheel and the first reflector.

9. The light source system as claimed in claim 5, wherein the first to the fourth solid-state light sources are laser solid-state light sources.

10. The light source system as claimed in claim 9, wherein the first and the second lights are blue lights, and the third light is a red light, a green light or a yellow light.

11. The light source system as claimed in claim 1, further comprising a light homogenizing element which optically couples with the TIR prism.

* * * * *